Dec. 15, 1931.

C. ABSMEIER

PLASTER BOARD

Original Filed Nov. 23, 1925

Re. 18,286

Inventor
Carl Absmeier
By Frank E. Liverance, Jr.
Attorney

Reissued Dec. 15, 1931 Re. 18,286

UNITED STATES PATENT OFFICE

CARL ABSMEIER, OF LA GRANGE PARK, ILLINOIS, ASSIGNOR TO UNITED STATES GYPSUM COMPANY, OF CHICAGO, ILLINOIS

PLASTER BOARD

Original application filed November 23, 1925, Serial No. 70,765. Renewed November 10, 1927. Original No. 1,657,333, dated January 24, 1928. Application for reissue filed March 2, 1931. Serial No. 519,487.

This invention relates to plaster board and is more particularly concerned with a novel construction of covering for the body of the board and a novel interlocking means of joining the covering sheets of fibrous material which are used to cover the plaster body at the edges of said board. In the making of plaster board it is common practice to make a body of cementitious material, usually a plaster of Paris composition, which is covered on opposite sides with fibrous material, usually a certain type of paper. The edges of the board are sometimes left uncovered and in other cases are covered in various manners. My invention is directed particularly to a new edge covering for plaster board which comprises interlocking tongues on opposite pieces of paper covering for the opposite sides of the plaster board which are turned inwardly toward each other and are bent under the adjacent inwardly turned or edge portions of the paper covering making a secure and interlocking connection of the opposite covering sheets for the plaster board at the edges thereof.

Constructions which embody my invention are fully shown in the accompanying drawings, in which, Fig. 1 is a fragmentary perspective view showing opposed covering sheets for the body of plaster, the same being separated.

Like reference characters refer to like parts in the different figures of the drawings.

Figure 1:
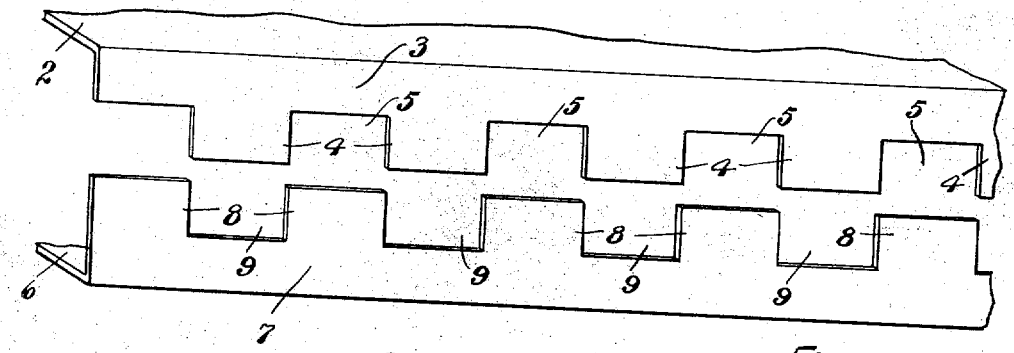

The body 1 of cementitious material may be of any desired width and length and it is relatively thin. On opposite sides of this body coverings of fibrous material, preferably certain grades of paper, are placed. The upper covering sheet 2 at its side edges is bent inwardly at right angles to make the edge section 3, which, at its edge, is cut to provide alternate tongues and recesses 4 and 5, the tongues 4 extending downwardly from the portion 3 of the paper covering. This is the construction at each edge of the plaster board.

The lower covering 6 has its edges turned upwardly at right angles to make the section 7 which, at its edge, is also cut to form alternate upwardly projecting tongues 8 and recesses 9 between the tongues. The position of the tongues and recesses on the two opposed edge sections 3 and 7 of the coverings is such that the tongues 4 are directly opposite the recesses 9 and, similarly, the tongues 8 are directly opposite the recesses 5.

When applied to the body 1 of plaster it is evident that tongues passing downwardly into the recess 9 may be bent inwardly so as to lie against the inner side of the part 7 below said recesses 9 and, in like manner, the tongues 8 may pass into the recesses 5 and thence be bent inwardly so as to lie within the inner sides of the edge section 3 of the upper covering sheet 2. This is fully shown in Fig. 3 and it is clear, as thus constructed, the tongues 4 and 8 are held in interlocked engagement, the plaster body 1 bearing against said tongues, it being understood that in the process of making the plaster board the covering sheets 2 and 6 with their edge portions 3 and 7 having the tongues 4 and 8 are applied while the plaster body is still in plastic state and it is rolled or otherwise worked into position that it presses against said tongues, the paper covering cementing to the plaster body as it sets and hardens.

Figure 2:
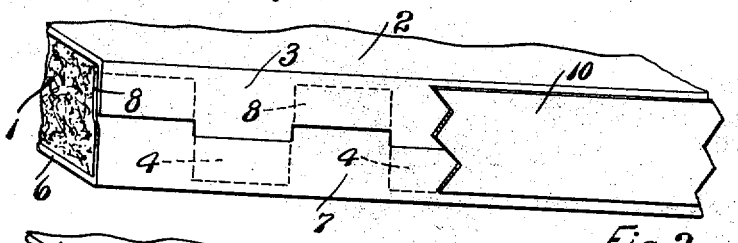
Fig. 2 is a fragmentary perspective view of an edge of the plaster board which has been covered.

The edge of the board thus made is shown in Fig. 2 and, if it is desired, a strip of paper 10 may be glued or otherwise cemented to the edge of the board so as to cover the joints which would appear otherwise. This paper strip serves to retain the moisture in the board edge, when said board is dried in a highly heated kiln and thus prevents recalcination of the gypsum core at the edge with the resultant destruction of the bond between the cover sheet and the core material. This, however, is not necessary for all purposes of the invention and my invention is in no sense limited to the addition of the covering strip 10, as shown in Figs. 2 and 3.

Figure 4:
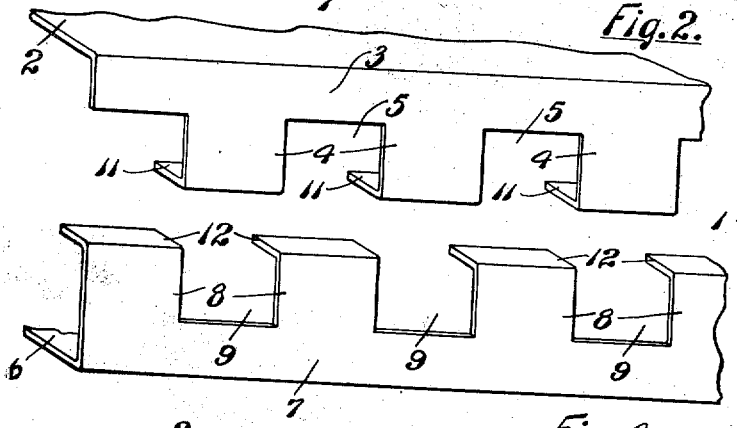
Fig. 4 is a view similar to Fig. 1 illustrating a somewhat different form of the invention.
Figure 5:
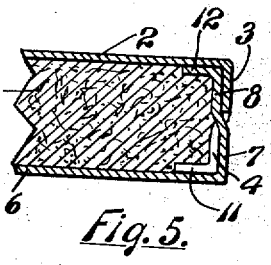
Fig. 5 is a transverse section similar to Fig. 3 of plaster board made with the coverings shown in Fig. 4.

In Figs. 4 and 5 another form of the invention is shown in which the tongues 4 are of greater length and have their end portions turned inwardly at right angles, as indicated at 11. The tongues 8 also are of greater length and have their upper end portions turned inwardly at right angles, as indicated at 12. When the board is made with covering of this character applied to the body 1 it will be evident that the tongues 11 and 12 extend inwardly along the inner sides of the lower and upper covering sheets 6 and 2, respectively, as shown in Fig. 5.

Figure 3:
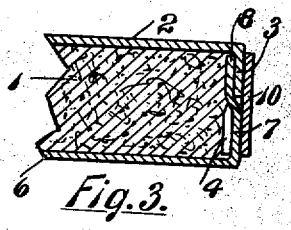
Fig. 3 is a fragmentary transverse section through the construction shown in Fig. 2.
Figure 6:
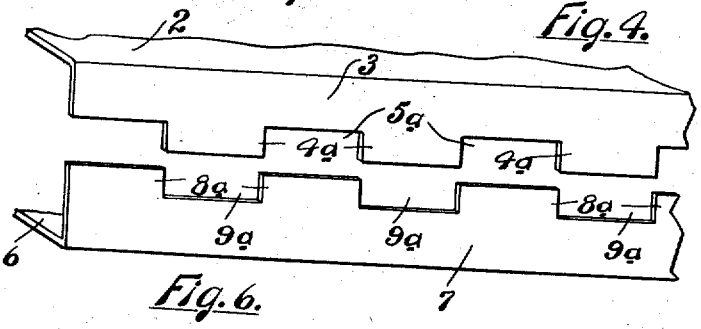
Fig. 6 is a perspective view similar to Fig. 1 illustrating a slight modification of the construction shown in Fig. 1.
Figure 7:
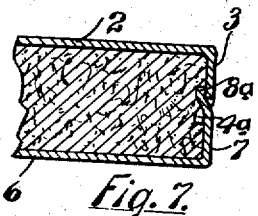
Fig. 7 is a section similar to that shown in Fig. 3 showing the plaster board equipped with the coverings illustrated in Fig. 6.

In Figs. 6 and 7 the construction shown is very similar to that shown in Figs. 1 and 3, the only difference being that the tongues 4*a* and 8*a* are shorter than the tongues 4 and 8 and the recesses 5*a* and 9*a* are correspondingly shallower. The section of the board formed with coverings of this character is shown in Fig. 7 and it is evident that the tongues 4*a* and 8*a* do not extend downwardly and upwardly as far as the tongues 4 and 8 in the construction shown in Fig. 3, but that an interlocking of the opposed covering sheets of paper at the edges of the board is made and a complete covering of the board edges is effected.

This construction of plaster board is simple and effective and is very easily produced without any involved process of manufacture. The invention is defined in the appended claims and is to be considered as comprehensive of all forms of structure coming within their scope.

I would state in conclusion, that while the illustrated examples constitute a practical embodiment of my invention, I do not wish to be limited precisely to these details, since manifestly the same may be considerably varied without departing from the spirit of the invention as defined in the appended claims.

Having thus described my invention, I claim as new and desire to secure by Letters Patent:

1. Plaster board of the character described comprising a flat body and a covering sheet on each face of the body, said sheets at an edge of the body being folded toward each other and against said edge of the body, the edges of said sheets being formed with alternate tongues and recesses between said tongues, the tongues on the sheets entering the recesses on the opposite sheets and being bent inwardly and extending beyond the bottoms of said recesses at the inner sides of the edge portions of said covering sheets.

2. Plaster board of the character described comprisng a flat body and a covering sheet of material on each face of the body, said sheets at the opposite edges of the body being folded toward each other and against the edges of the body and each being provided with projecting tongues separated by recesses, said tongues having interlocking engagement with each other and the opposite covering sheets.

3. Plaster board of the character described comprising a flat body of cementitious material, and a covering sheet on each face of the body, said sheets at each edge of the body being folded toward each other and each being provided with projecting tongues separated by recesses, the tongues on one sheet passing between tongues on the opposite sheet and lying against the inner sides of the edge portion of said sheets beyond the bottoms of said recesses.

4. Plaster board of the character described comprising a flat body, and a covering sheet on each face of the body, said sheets at an edge of the body being folded toward each other and against said edge of the body, the edges of said sheets being formed with alternate tongues and recesses between said tongues, said tongues on one sheet passing between the tongues on the opposite sheet and lying against the inner sides of the edge portion of said sheets and at their ends being bent inwardly substantially at right angles so as to lie above and below the body adjacent the edges of said body.

5. Plasterboard of the character described, comprisng a flat body, a covering sheet of material on each face of the body, said sheets at the opposite edges of the body being folded toward each other and against the edges of the body, each being provided with projecting tongues separated by recesses, said tongues having interlocking engagement with each other and the opposite covering sheets, and a protective strip of paper adhesively attached to said board edge.

6. Plasterboard of the character described comprising a flat body, a covering sheet of material on each face of the body, one of said sheets at the opposite edges of the body being folded toward and engaging with the other of said sheets to form a board edge, and a protective strip of paper adhesively attached to said board edge.

-CARL ABSMEIER.